United States Patent [19]
Ebbing et al.

[11] Patent Number: 5,129,752
[45] Date of Patent: Jul. 14, 1992

[54] RZEPPA JOINT SOCKET PLATE TORQUE RESTRAINT ASSEMBLY FOR A VARIABLE DISPLACEMENT COMPRESSOR

[75] Inventors: David M. Ebbing, Clarence Center; Robert L. Swadner, E. Amherst; Jerome E. Puterbaugh, Getzville, all of N.Y.

[73] Assignee: General Motors Corporation, Detroit, Mich.

[21] Appl. No.: 504,817

[22] Filed: Apr. 5, 1990

[51] Int. Cl.$^5$ .............................. F16B 1/00; F04B 1/26
[52] U.S. Cl. ...................................... 403/24; 403/114; 417/222 R; 417/222 S; 92/12.2; 74/60
[58] Field of Search ............... 417/222 R, 269, 222 S; 92/12.2, 71; 384/497; 74/60; 403/24, 114, 76

[56] References Cited

U.S. PATENT DOCUMENTS

| | | | |
|---|---|---|---|
| 2,917,931 | 12/1959 | Sherman | 92/12.2 |
| 4,145,163 | 3/1979 | Fogelberg et al. | 417/222 |
| 4,221,545 | 9/1980 | Terauchi | 74/60 X |
| 4,480,964 | 11/1984 | Skinner | 417/222 |
| 4,784,045 | 11/1988 | Terauchi | 417/269 X |

FOREIGN PATENT DOCUMENTS 2155115  9/1985  United Kingdom ............... 417/222

*Primary Examiner*—Peter M. Cuomo
*Attorney, Agent, or Firm*—Ronald L. Phillips

[57] ABSTRACT

An assembly for providing socket plate torque restraint for a variable displacement wobble plate compressor includes a non-rotary Rzeppa joint. The joint has an outer race, an inner race, grooves in the races, a plurality of torque receiving balls and a cage for properly maintaining and positioning the balls in the grooves for operation. The joint is connected to an anti-rotational shaft. The shaft is mounted by the drive hub of the compressor to allow for translational axial and relative rotational motion. At least one key is received in a keyway in the anti-rotational shaft and a companion socket in the cylinder block fixed to the compressor housing. The Rzeppa joint provides the ideal kinematic restraint motion of the socket plate; the profile of the grooves on the inner and outer races and the cage having a curvature to effectively maintain the balls situated substantially in a single torque transmitting plane that bisects the joint angle. The joint effectively transmits the restraining torque to the anti-rotational shaft without vibration. The key on the shaft in turn efficiently transmits the socket plate restraining torque from the shaft to the compressor housing.

4 Claims, 2 Drawing Sheets

RZEPPA JOINT SOCKET PLATE TORQUE RESTRAINT ASSEMBLY FOR A VARIABLE DISPLACEMENT COMPRESSOR

TECHNICAL FIELD

The present invention relates generally to variable displacement compressors, and more particularly, to an improved assembly for providing socket plate torque restraint for a variable displacement wobble plate compressor.

BACKGROUND OF THE INVENTION

A popular type of refrigerant compressor for use in vehicle air conditioning systems involves a wobble or nutating drive mechanism to provide infinitely variable displacement. In this type of compressor, a plurality of cylinders are equally angularly spaced about a cylinder block and housing, and equally radially spaced from the axis of a central drive hub. A piston is mounted for reciprocating motion in each of the cylinders. A piston rod connects each piston to a non-rotatable socket or wobble plate that provides the nutating motion in response to a rotating drive shaft included in the central drive hub. The driving of the socket plate in a nutating path serves to impart the linear reciprocating motion to the pistons, thereby providing proper compressor operation. By varying the angle of the socket plate relative to the drive hub, by internal refrigerant gas pressure, the stroke of the pistons and, therefore, the displacement or capacity of the compressor is varied.

The action of the nutating socket plate in the refrigerant compressor inherently results in it being subjected to torque. In order for the compressor to properly function, the torque applied to the socket plate must be properly restrained; i.e. an equal and opposite torque must be transmitted to a fixed structure, such as to the compressor housing. A common method of restraining torque found in prior art socket plate compressors involves the use of a guide pin/slider assembly, such as that disclosed in U.S. Pat. No. 4,480,964 to Skinner, issued Nov. 6, 1984. The guide pin is fixed to the cylinder block and a ball guide is slidably mounted thereon and retained on the socket plate. The guide pin thus prevents the socket plate from rotating with the rotary drive plate and allows the torque applied to the socket plate to be restrained by transmitting an equal and opposite torque through the cylinder block to the fixed housing.

This torque restraint design undesirably produces torsional oscillations. It can be appreciated that the axis of the socket plate does not coincide with the axis of the drive hub, but rather varies through a variety of angular positions with respect to the drive hub as it travels in its nutating path. As a result of the variation of the angular relationship between the drive hub and the socket plate, as the non-rotating socket plate wobbles or nutates, a torsional acceleration and deceleration action results in the drive shaft. The torsional oscillation resulting from the alternating acceleration and deceleration of the drive shaft occurs twice per drive hub revolution. This torsional oscillation creates undesirable vibration within the compressor.

While this prior art torque restraint design has thus proved generally effective, there is some need for improvement to alleviate the vibration problem. More specifically, there is a need to provide a mechanism that prevents socket plate rotation without inducing torsional oscillation in the drive shaft. The ideal socket plate torque restraint mechanism would prevent rotation of the socket plate that is positioned and driven by an angled journal of a drive hub in a manner such that the inertial torque reaction of the socket plate about the axis of the drive hub and shaft is zero at any instant. The socket plate torque restraint mechanism would produce an equal and opposite torque to that applied to the socket plate and carry it to a fixed structure within the compressor assembly. Such a socket plate torque restraint mechanism would substantially eliminate higher order vibration, while effectively transmitting a restraining torque from the socket plate to the fixed compressor housing.

SUMMARY OF THE INVENTION

Accordingly, it is a primary object of the present invention to provide a socket plate torque restraint mechanism that prevents socket plate rotation while substantially eliminating torsional vibration of the compressor.

It is still another object of the present invention to provide an assembly that efficiently transmits socket plate restraining torque through an anti-rotational shaft to the fixed compressor housing.

Still another object of the present invention is to provide an assembly that uniformly restrains the socket plate motion relative to the drive mechanism.

It is another object of the present invention to provide a socket plate torque restraint mechanism that allows the refrigerant compressor to operate at higher speeds without a substantial increase in torsional vibrations.

Another object of the present invention is to utilize a socket plate torque restraint mechanism providing ideal kinematic restraint motion for the socket plate through the use of a Rzeppa constant velocity joint.

It is an additional object of the present invention to provide a mechanism that substantially eliminates the inertial torque acting on the drive hub and compressor housing that is presently found with the use of conventional socket plate torque restraint mechanisms.

Additional objects, advantages and other novel features will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved socket plate torque restraint assembly for a variable displacement wobble plate compressor is provided. The socket plate torque restraint assembly offers the desirable quality of uniformly restraining the socket plate motion relative to the drive mechanism. This eliminates the normal inertial torque acting on the drive hub and the compressor case, thus eliminating torsional oscillation or vibration of the drive hub and allowing smooth, high speed operation of the compressor.

Advantageously, the socket plate torque restraint assembly includes a Rzeppa constant velocity joint, such as is commonly used in the drive mechanism of a front wheel drive automobile. As is generally known in the art, the Rzeppa constant velocity joint consists of an outer race, an inner race, a set of torque receiving or transmitting balls and a cage that properly positions the torque transmitting balls for proper operation of the joint. The torque transmitting balls are retained in corresponding grooves in the inner and outer races. The profile of the grooves and cage cooperatively permit the balls to be properly positioned as the socket plate nutates during compressor operation.

More particularly, for use as a restraint in the compressor in accordance with the present invention, the outer race is attached to the socket plate. The inner race is attached to a centrally located anti-rotational shaft and is constrained from rotating. Thus, the attached socket plate is also prevented from rotating through the action of the torque receiving balls in between. The socket plate as a result can wobble or nutate as it is being driven by the angled journal of the rotary drive hub.

As the socket plate nutates during compressor operation, the Rzeppa joint advantageously provides the ideal kinematic restraint motion for the socket plate. More specifically, the different positions of the socket plate define different joint angles between the axis of the drive hub and the axis of the socket plate. As the outer race changes position, it forces the torque receiving balls to change position within the corresponding grooves between the outer race and the inner race. Advantageously, the balls are always situated in a single torque transmitting plane that bisects the joint angle. The balls rest in a plane perpendicular to the plane common to both axes and are located at the true joint center. The cage acts to facilitate this action and to hold the balls in correct alignment.

When used in a drive mechanism for front-wheel drive automobiles, a Rzeppa constant velocity joint that couples rotating shafts at an angle relative to each other allows the shafts to rotate uniformly at substantially the same angular velocity. Thus, the driven shaft is not subjected to any acceleration during its motion. The constant velocity joint in the present application for a variable stroke compressor ensures that for any constant compressor speed, the angular acceleration induced in the rotating drive hub by the non-rotating socket plate is substantially non-existent throughout the complete rotation of the drive hub. This uniform restraining action advantageously eliminates the normal uneven inertial torque acting through the drive hub and transmitted to the compressor housing. The need for balancing devices and stop-gap measures employed in the past when the conventional socket plate torque restraint mechanisms are used, is now eliminated.

In accordance with a further aspect of the invention, the socket plate torque restraint assembly includes a centrally located anti-rotational shaft that receives the inner race of the Rzeppa/constant velocity joint. The shaft is advantageously mounted to allow translational axial motion within the compressor housing but prevent rotational motion. More specifically, the anti-rotational shaft is supported by a needle bearing at its end adjacent the drive hub. The needle bearing is pressed into the drive hub, and thus the hub rotates relative to the anti-rotational shaft. The needle bearing further allows the shaft to axially translate and still be supported.

The shaft is machined with a keyway that receives a restraining key. The key is fixed to the cylinder block by a mating slot. The key is press fitted into the cylinder block slot and the exposed portion of the key engages the mating slot in the anti-rotation shaft. The slot in the anti-rotational shaft is slightly larger in dimension than the key to allow relative sliding action between the pin and shaft as the shaft translates within the compressor.

This key restraint concept completes the assembly that allows the torque applied to the socket plate to be restrained by having an equal and opposite torque transmitted through the Rzeppa constant velocity joint to the anti-rotational shaft, and ultimately through the key to the cylinder block and compressor housing. Advantageously, the assembly as it transmits torque from the socket plate to the compressor housing works full time regardless of the adjusted mode of the compressor, from full to minimum compression.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

A variable displacement socket plate compressor 10 includes an improved socket plate torque restraint assembly 12, constructed in accordance with the teachings of the present invention. As will be appreciated from a review of the following description, in conjunction with the drawings of the preferred embodiment, the restraint assembly 12 efficiently transmits torque from the socket plate 14 to the compressor housing 16 while substantially reducing torsional vibrations associated with the action of the compressor 10.

Figure 1:
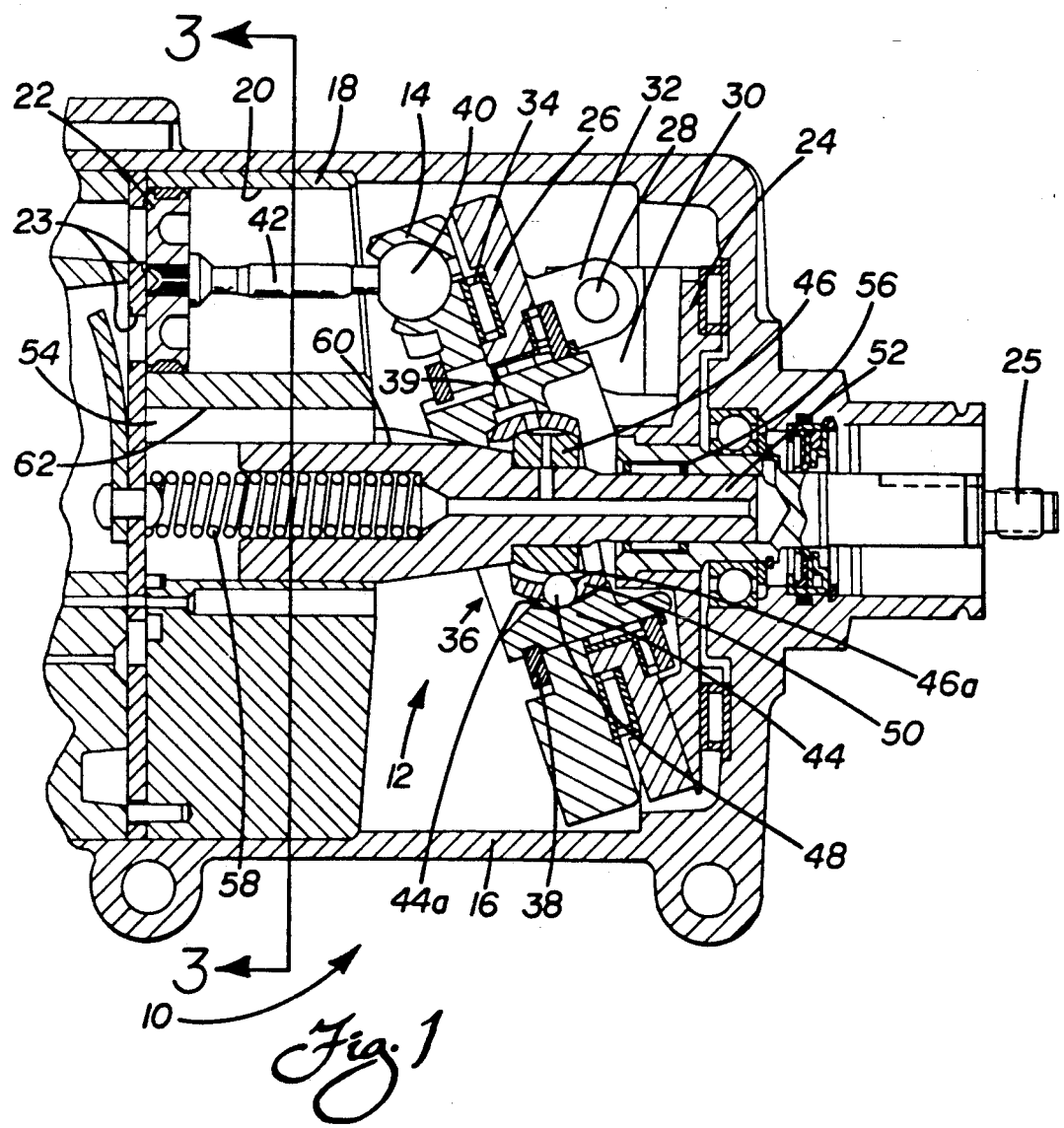
FIG. 1 is a partial cross-sectional view of the variable displacement socket plate compressor including the improved socket plate torque restraint assembly of the present invention.
Figure 3:
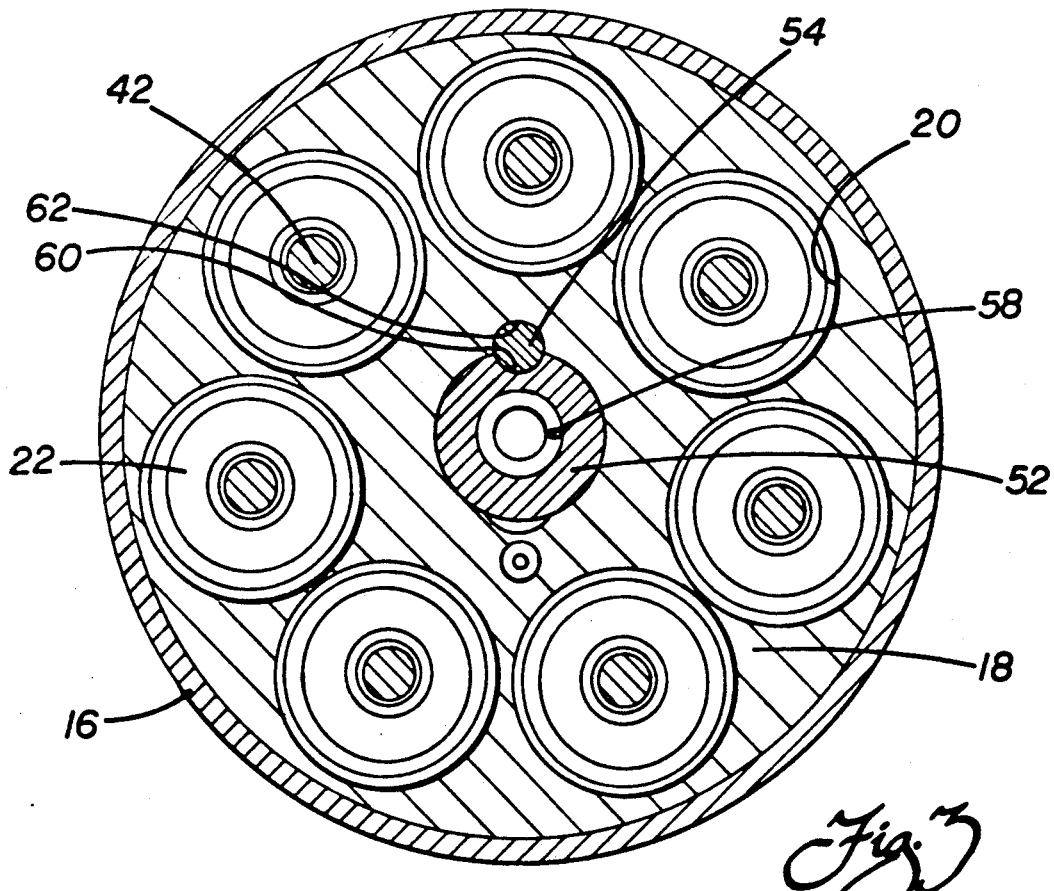
FIG. 3 is a cross-sectional view of the compressor taken along section line 3—3 of FIG. 1.

The compressor 10 includes a cylinder block 18 having a plurality of cylinder bores 20 (only one shown in FIG. 1). The preferred embodiment of the present invention is contemplated for use with a refrigerant compressor having seven cylinder bores 20 (see FIG. 3). However, it can be appreciated that refrigerant compressors can be designed with a fewer or greater number of cylinder bores 20.

A piston 22 is slidingly engaged for reciprocal motion within each of the cylinder bores 20. The reciprocating action of the pistons 22 compresses the refrigerant. The compressed refrigerant passes through discharge ports 23 of the compressor 10, and after further processing it is utilized by the air conditioning system of the vehicle (not shown) to condition air being directed to the vehicle interior. Following use, the refrigerant is returned to the compressor 10 through a suction port (not shown) to complete the cycle.

A drive hub 24 is axially aligned with the cylinder block 18 at the opposite end of the compressor housing 16. The drive shaft 25 of the hub 24 extends externally of the compressor housing 16 to engage the driving pulley of the automobile engine (not shown). During engine operation, power is transmitted from the engine to the drive shaft 25 and thence to the drive hub 24.

A journal 26 is positioned to provide the actual driving action to reciprocate the pistons 22. For this purpose, the journal 26 actually forms a part of the drive hub 24 with two pivotal drive pins 28 received within kidney slots formed on flanges 30 of the drive hub 24. The drive pins 28 are press fit into holes in a corresponding set of journal ears 32. The engagement between the journal 26 and the drive hub 24 thus forces the journal 26 to rotate with the drive hub 24 providing a means to alter the angular orientation of the journal relative to the rotational axis of the hub. The socket plate 14 is in juxtaposition and freely rotatable with respect to the journal 26 through a drive bearing 34. The socket plate 14 is prevented from rotating by its connection to the non-rotary Rzeppa joint 36 by means of a snap ring 38 and keyway 39.

In operation, as the drive hub 24 is driven, the journal 26 is rotated. This in turn imparts a nutating motion to the non-rotary socket plate 14. The pistons 22 are connected to the socket plate 14 by a ball 40 of a piston rod 42. The angle of the journal 26 to the drive hub 24 can be varied, thus determining the precise path traveled by the socket plate 14. More specifically, when the journal 26 is positioned at a substantially maximum angle as shown in FIG. 1, the nutating motion of the socket plate 14 is at a maximum. Thus, in this position, it should be appreciated that the pistons 24 are reciprocated through their full stroke. As a result, the compressor 10 operates at maximum capacity.

Conversely, when the journal 26 is adjusted so as to be perpendicular to the drive hub 24, the journal 26 spins freely without imparting nutating motion to the socket plate 14. The pistons 22 do not reciprocate in this operative situation. Thus, the operation of the compressor 10 is effectively terminated at this position. It can be appreciated that by infinitely varying the angle of the journal 26 anywhere between these two extremes, the operation of the compressor 10 at an infinite number of intermediate capacity levels may be achieved, as desired.

It can be appreciated that while the non-rotary socket plate 14 is traveling in its nutating path, it is being subjected to torque as a result of the piston pumping forces, which are in turn reacted by driving torque exerted by the rotating journal 26. Proper operation of the compressor 10 mandates that this socket plate torque be restrained. More particularly, a torque equal and opposite to the torque applied to the socket plate 14 must be transmitted to ground, i.e. a fixed structure, such as the compressor housing 16, must be interconnected. The assembly of the present invention efficiently accomplishes this important task. Additionally, the inventive joint assembly substantially eliminates the inertial torque acting on the drive hub 24 that is common with prior art compressors, thus allowing the compressor 10 to operate at higher speeds and virtually vibration free.

According to a very important aspect of the invention, the torque applied to the socket plate 14 is restrained through the use of the Rzeppa constant velocity joint 36. Broadly, the Rzeppa joint is a well known prior art mechanism for transferring constant velocity rotary motion between two shafts at an angle. As indicated above, a common use of such a joint is in the front wheel drive of an automobile. This use and others are well documented, such as in the publication *Machine Design*, Apr. 1953 issue and entitled Universal Joint Drives by A. H. Rzeppa. The prior art applications discussed in this article and otherwise known, the joint is rotating, and not used as a restraint or anti-rotational device as in the present invention.

Figure 2:
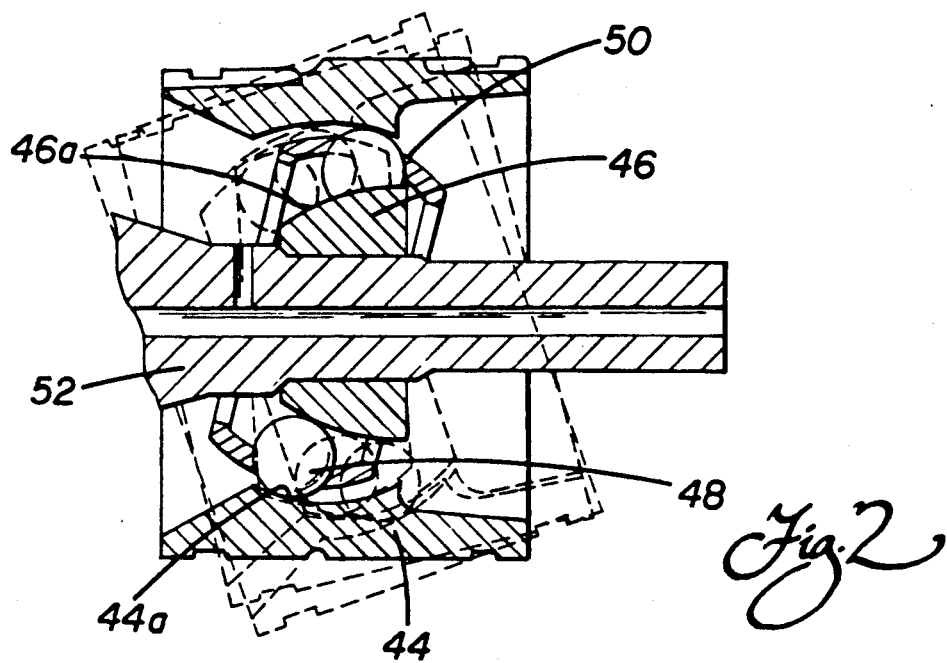
FIG. 2 is an enlarged cross-sectional view of the Rzeppa constant velocity joint included in the assembly, showing in phantom the torque transmitting balls and other components in proper position for several joint positions.

The Rzeppa joint 36 thus includes an outer race 44 and an inner race 46. The races 44, 46 each have a plurality of corresponding grooves 44a, 46a, each set of grooves receiving one of a plurality of torque receiving balls 48 (see FIG. 2). In the preferred embodiment, the Rzeppa joint 36 includes six torque receiving balls 48 (only two being shown). However, it can be appreciated that a fewer or greater number of balls 48 may be utilized. A cage 50 is provided to assure annular positioning of the torque receiving balls 48 within the Rzeppa joint 36.

The inner race 46 is rotationally fixed relative to the outer race 44. The outer race 44 is thus secured against rotation. The non-rotary outer race, while it effectively prevents the socket plate 14 from rotating, it does allow back and forth travel with the socket plate 14 as it nutates. More particularly, the motion of the outer race 44 with respect to the inner race 46 is facilitated by the rolling engagement of the balls 48 within the corresponding grooves 44a, 46a of the races 44, 46 (see FIG. 2). The nutating motion of the outer race 44 means that the races 44, 46 take an infinite number of angular positions with respect to each other.

The advantage of the Rzeppa joint 36 is that for each position of the races 44, 46 relative to each other, because of the profile of the operative surfaces of the grooves 44a, 46a, the receiving balls 48 seek a plane that bisects the joint angle between the axis of the inner race 46 and the axis of the outer race 44. The joint angle further defines the single torque transmission plane between the drive hub 24 including the journal 26 and the socket plate 14.

To put it another way, the axis of the drive hub 24 is situated in a different plane from the axis of the rotating journal 26, and accordingly different from the axis of the socket plate 14. However, with prior art socket plate torque restraint mechanisms, since the socket plate is restrained from rotating, torsional oscillation or vibration is induced in the drive hub 24, normally 2 times per revolution. The constant velocity (zero acceleration) ratio between the drive hub 24 and the socket plate 14 of the present invention prevents this undesirable result.

More particularly, the non-rotary socket plate 14 is positioned and driven by the angled journal 26 on the drive hub 24 in a manner such that the inertial torque reaction of the socket plate 14 about the axis of the drive hub 24 is zero at any instant. As with a constant velocity Rzeppa joint in a drive mechanism of an automobile, the uniform motion established between the drive hub 24 and the socket plate 14 is advantageously aided by the proper positioning of the torque receiving balls 48 in the plane between the races 44, 46 due to the profile of the grooves 44a, 46a (see FIG. 2).

The anti-rotational shaft 52 is coaxially mounted for relative rotation with respect to the drive hub 24 and to allow for translational axial motion. More particularly, the shaft 52 axially translates within a needle bearing 56 pressed into the rotary drive hub 24. Accordingly, the drive hub 24 is allowed to rotate around the shaft 52 without imparting rotary motion thereto. The needle bearing 56 allows the shaft 52 to slide translationally within the hub 24.

The translational capability of the shaft 52 allows for upstroking and destroking of the compressor 10. More particularly, the angle of journal/socket plate is capable of being altered due to relative translational motion of the anti-rotational shaft 52. The upstroking force of the compressor 10 is provided by a helical coil return spring 58.

The anti-rotational shaft 52 is machined with a keyway 60 (see FIG. 1) in which restraining key 54 slidingly rests. The keyway 60 allows relative axial sliding motion between the shaft 52 and the key 54 as the former translates within the compressor 10. The keyway 60 has a mating slot or socket 62 formed in the cylinder block 18 to receive the other side of the pin 54. The slot 62 preferably wraps around the key 54, encompassing greater than one-half of the key 54 surface. The key 54 is press fitted into the slot 62 and the exposed portion of the key 54 slidably engages the keyway 60 on the shaft 52. The cylinder block 18 is slip fit into housing 16. When the rear head is bolted in place, pressure at the stop at the cylinder housing holds the cylinder from rotation.

In operation, as the hub 24/journal 26 drives the non-rotary socket plate 14 in its nutating path, the socket plate 14 is subjected to an undesirable torque. The non-rotary Rzeppa joint 36 prevents the socket plate 14 from rotating and restrains the torque imposed thereon. The cooperating action of the outer race 44, inner race 46, torque receiving balls 48 and cage 50 provide the ideal kinematic restraint motion for the socket plate 14, eliminating vibration associated with torsional oscillation of the drive hub 24.

While the anti-rotational shaft 52 is allowed to translate, it is maintained in sliding engagement with the key 54 that is fixed in socket 62 of the cylinder block 18, which in turn is fixed to the housing 16. Thus, the socket plate restraining torque is transmitted from the anti-rotational shaft 52 through the key 54 to the cylinder block 18, and subsequently to the fixed compressor housing 16. Thus, the assembly of the present invention advantageously restrains the torque applied to the socket plate 14 and efficiently transmits the restraining torque to the fixed compressor housing 16 to substantially eliminate compressor vibration.

In summary, numerous benefits are obtained by use of the present invention. The variable displacement socket plate compressor 10 includes a torque restraint assembly 12 that prevents the socket plate 14 from rotating while restraining its applied torque and transmitting it to the fixed compressor housing 16. The torque restraint assembly 12 includes the Rzeppa joint 36 that is attached to the coaxial anti-rotational shaft 52. The shaft 52 engages the key 54 that is retained within the cylinder block 18. The Rzeppa joint 36 due to the ideal profile of the grooves 44a, 46a cooperating with the balls 38 restrains the socket plate motion relative to the rotating journal 26 driven by the drive hub 24. This action substantially eliminates the inertial torque acting on the drive hub 24 that has in the past caused deleterious vibrations in the compressor.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. An assembly for providing torque restraint of a socket plate for a variable displacement wobble plate compressor that operates by selectively adjusting the angle of the socket plate relative to a rotatable drive hub so as to infinitely vary the stroke of compressor pistons reciprocating within bores of a cylinder block between full displacement and zero displacement, said compressor also having a fixed compressor housing, comprising:
   a non-rotary joint means for restraining torque applied to said socket plate by said drive hub and for reducing vibration;
   anti-rotational shaft means connected to and extending through said joint means;
   means for mounting said anti-rotational shaft means against rotation at one end to said cylindrical block and to provide for sufficient translational axial motion so as to allow selective adjustment of the operating angle of said socket plate to allow variable displacement operation; and
   means for coaxially supporting an opposite end of said anti-rotational shaft means within said drive hub for relative rotational movement, said drive hub being rotatably supported by said compressor housing, said shaft support means transmitting the socket plate restraining torque to said compressor housing via said drive hub,
   wherein socket plate rotation is prevented and torsional vibration is substantially reduced.

2. An assembly for providing torque restraint of a socket plate for a variable displacement wobble plate compressor that operates by selectively adjusting the angle of the socket plate relative to a rotatable drive hub so as to infinitely vary the stroke of compressor pistons reciprocating within bores of a cylinder block between full displacement and zero displacement, said compressor also having a fixed compressor housing, comprising:
   a non-rotary Rzeppa joint for restraining torque applied to said sockets plate by said drive hub, said joint including an outer race, an inner race, grooves in said inner and outer races, a plurality of torque receiving balls and a cage for properly maintaining the annular position of said torque receiving balls;

said grooves and said cage cooperating to position said balls in a single torque transmission plane between said plate and said drive hub;

a centrally located anti-rotational shaft connected to and extending through the inner race of said joint;

means for mounting said anti-rotational shaft at one end to said cylindrical block to provide for sufficient translation axial motion so as to allow selective adjustment of the operating angle of said socket plate to allow variable displacement operation and to further provide relative rotational motion; and means for coaxially supporting an opposite end of said anti-rotational shaft within said drive hub for relative rotational movement, said drive hub being rotatably supported by said compressor housing so as to transmit the socket plate restraining torque through said balls of said joint and to said compressor housing via said drive hub, whereby socket plate rotation is prevented and torsional vibration is substantially reduced.

3. An assembly for providing torque restraint of a socket plate for a variable displacement wobble plate compressor that operates by selectively adjusting the angle of the socket plate relative to a rotatable drive hub so as to infinitely vary the stroke of compressor pistons reciprocating within bores of a cylinder block between full displacement and zero displacement, said compressor also having a fixed compressor housing, comprising:

a non-rotary Rzeppa joint for restraining torque applied to said socket plate, said joint including an outer race, an inner race, grooves in said inner and outer races, a plurality of torque receiving balls and a cage for properly maintaining the annular position of said torque receiving balls;

the profile of said grooves on said inner and outer races and said cage having a curvature to effectively maintain the balls situated substantially in a single torque transmitting plane that bisects the joint angle;

an anti-rotational shaft connected to and extending through said inner race of said Rzeppa joint;

means for mounting said anti-rotational shaft at one end to said cylindrical block to provide for sufficient translational axial motion so as to allow selective adjustment of the operating angle of said socket plate to allow variable displacement operation and to further provide relative rotational motion; and at least one key for transmitting said socket plate restraining torque to a corresponding keyway in said cylinder block supported by said compressor housing, means for coaxially supporting an opposite end of said anti-rotational shaft within said drive hub for relative rotational movement, said drive hub being rotatably supported by said compressor housing so as to transmit the socket plate restraining torque through said balls of said joint and to said compressor housing via said drive hub, whereby socket plate rotation is prevented and torsional vibration is substantially reduced.

4. An assembly for providing torque restraint of a socket plate for a variable displacement wobble plate compressor that operates by selectively adjusting the angle of the socket plate relative to a rotatable drive hub so as to infinitely vary the stroke of compressor pistons reciprocating within bores of a cylinder block between full displacement and zero displacement, said compressor also having a fixed compressor housing, comprising:

non-rotary Rzeppa joint means for restraining torque applied to said socket plate by said drive hub;

anti-rotational shaft means connected to and extending through said joint means;

means for mounting said anti-rotational shaft means against rotation at one end to said cylinder block to provide for sufficient translational axial motion so as to allow selective adjustment of the operating angle of said socket plate to allow variable displacement operation; and means for coaxially supporting an opposite end of said anti-rotational shaft means within said drive hub for relative rotational movement, said drive hub being rotatably supported by said compressor housing, said shaft support means transmitting the socket plate restraining torque to said compressor housing via said drive hub, whereby socket plate rotation is prevented and torsional vibration is substantially reduced.

* * * * *